Dec. 18, 1945.  N. F. DOUR ET AL  2,391,141
REEL CONSTRUCTION
Filed Dec. 8, 1941  4 Sheets-Sheet 1

Inventors,
Nicholas F. Dour
and Victor R. Stenger,
BY
ATTORNEYS.

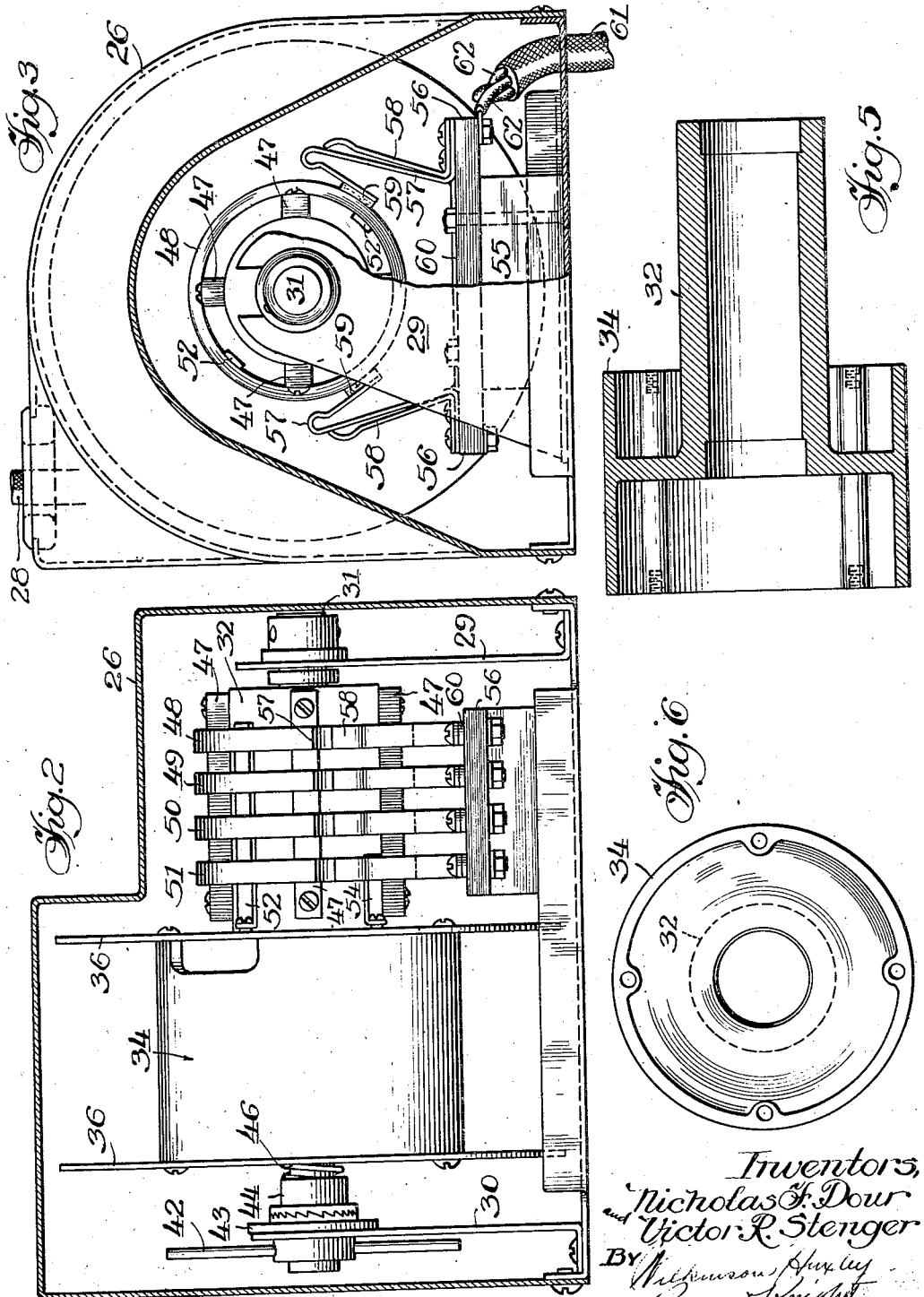

Dec. 18, 1945. N. F. DOUR ET AL 2,391,141
REEL CONSTRUCTION
Filed Dec. 8, 1941 4 Sheets-Sheet 3

INVENTORS,
Nicholas F. Dour
Victor R. Stenger
BY Wilkinson Huxley Byron Knight
Attys.

Dec. 18, 1945.  N. F. DOUR ET AL  2,391,141
REEL CONSTRUCTION
Filed Dec. 8, 1941  4 Sheets—Sheet 4
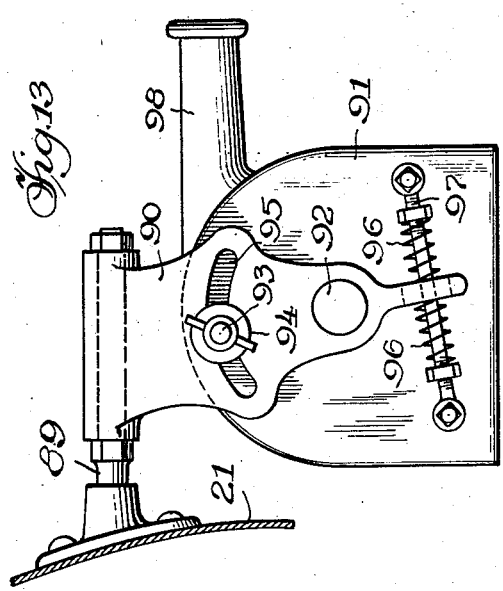
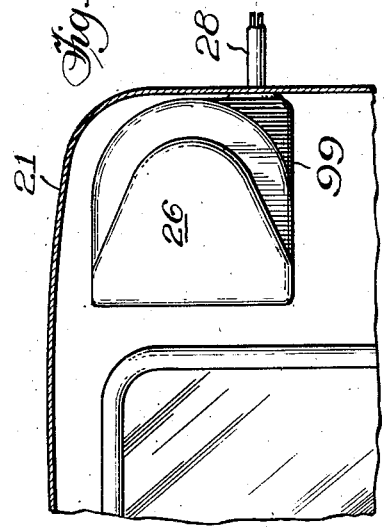
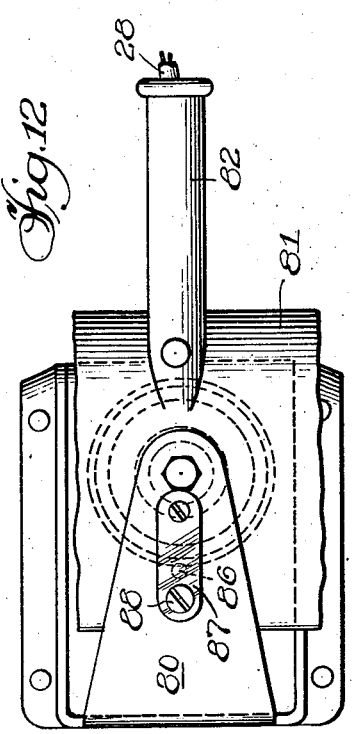
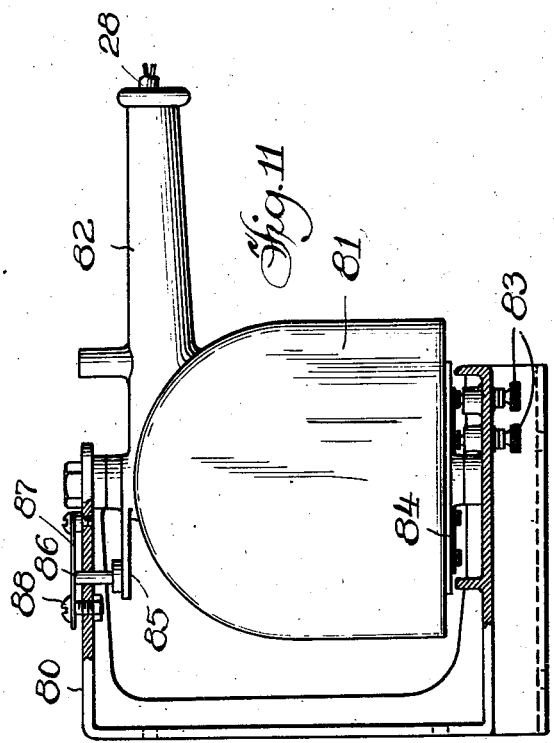
INVENTORS.
Nicholas F. Dour
Victor R. Stenger
BY Patented Dec. 18, 1945

2,391,141

UNITED STATES PATENT OFFICE 2,391,141

REEL CONSTRUCTION

Nicholas F. Dour, Chicago, and Victor R. Stenger, Hinsdale, Ill.

Application December 8, 1941, Serial No. 422,058

3 Claims. (Cl. 191—12.2)

Our invention relates to electric transmission cable reels for use particularly with a trailer type of truck and has particular reference to a reel adapted to be mounted upon the cab portion of the truck either inside or outside the cab, with a cable thereon which leads to an outlet box mounted upon some readily accessible part of the body of the truck, preferably the front portion thereof, in such manner that the transmission cable is kept fairly taut without slack to compensate for the varying distances between the tractor and the trailer parts of the truck, particularly during the turning of corners and when backing the truck body into various loading and unloading platforms where the tractor portion of the truck is apt to be at a considerable angle to the body of the truck.

Another and further object of the invention is the provision of an electrical transmission cable reel adapted to handle a cable containing a plurality of transmission wires, so that current is carried through the cable for lighting the various lights needed on the truck body, and mounted on the truck in such manner that during operation of the truck the conductor cable will not sag or drop down in a loose condition to become engaged with some part of the truck and damaged, pulled out of the outlet box or the like.

Another and further object of the invention is the provision of a conductor reel which automatically rewinds and takes up the slack of a cable due to any shortening of the distance in the two mounting points of the cable, and likewise allows the cable to run out of the reel if and when this distance is increased, such as occurs when the tractor portion of the truck is in line with the body thereof, as distinguished from the position of the truck when the tractor portion is turned at an angle to the body of the truck, so that once the cable is fastened in position upon the truck it functions properly without any attention on the part of the driver.

A further object of our invention is the provision of a transmission cable reel mounted in such manner that if, through any unusual circumstance, the cable should become disconnected from the outlet on the body of the truck, the rewinding motion of the reel will be decreased by means of a brake attached thereto, which will prevent damage to the operating parts of the mechanism or breakage of the cable and the housing within which the reel is mounted, and also which protects the cable from breaking in case of overwinds.

Another and further object is the provision of a rewind reel having electrical conductors therein positioned in such manner that no interruption in the flow of electricity is likely to occur, and moving contacts are kept clean and free of dirt or carbon, thereby enabling the current to readily flow through these connections.

Another and further object of our invention is the provision of a cable reel so mounted upon a trailer truck that an electrical transmission cable is retained in convenient and workable condition at all times without any attention on the part of an operator, and which when the tractor is uncoupled from the body of the trailer, takes up the cable and retains it in easy position to be secured in place when the tractor is coupled to the body again or to another body, as the case may be.

These and other objects of our invention will be more fully and better understood by reference to the accompanying drawings, and in which—

Figure 2 is a side elevational view showing the housing and reel mounted therein;

Figure 3 is an end elevational view with the end cover of the housing removed;

Figure 5 is a sectional view of the reel spool hub;

Figure 6 is an end view of the large end of the hub shown in Figure 5;

Figure 11 is an elevational view of a modified form of housing for the cable with universal movement;

Figure 12 is a top plan view of the housing shown in Figure 11;

Figure 13 is a slightly modified form of reel housing with universal movement; and Figure 14 is a view showing the reel housing mounted inside of the cab.

Figure 1:
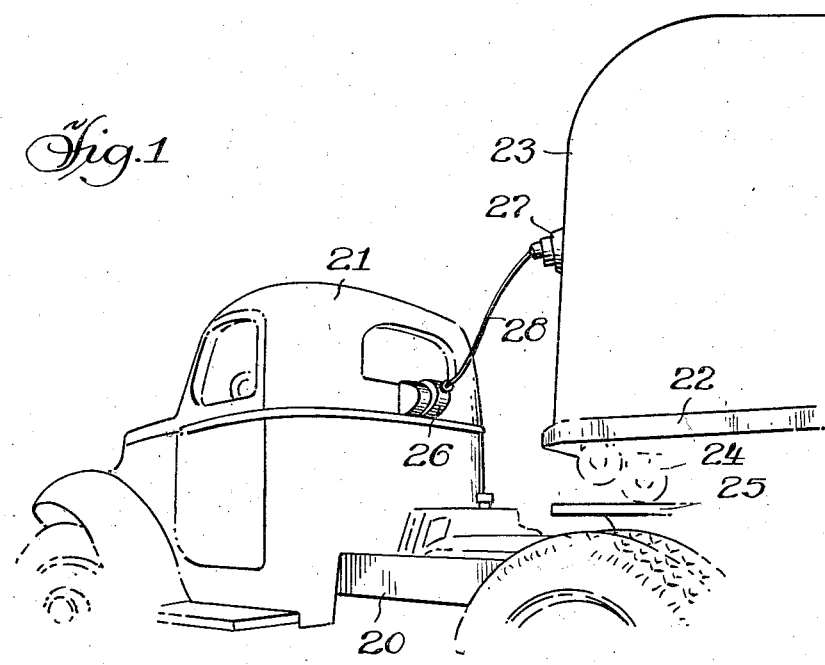
Figure 1 is a diagrammatic view showing our invention upon a tractor type of truck.
Figure 4:
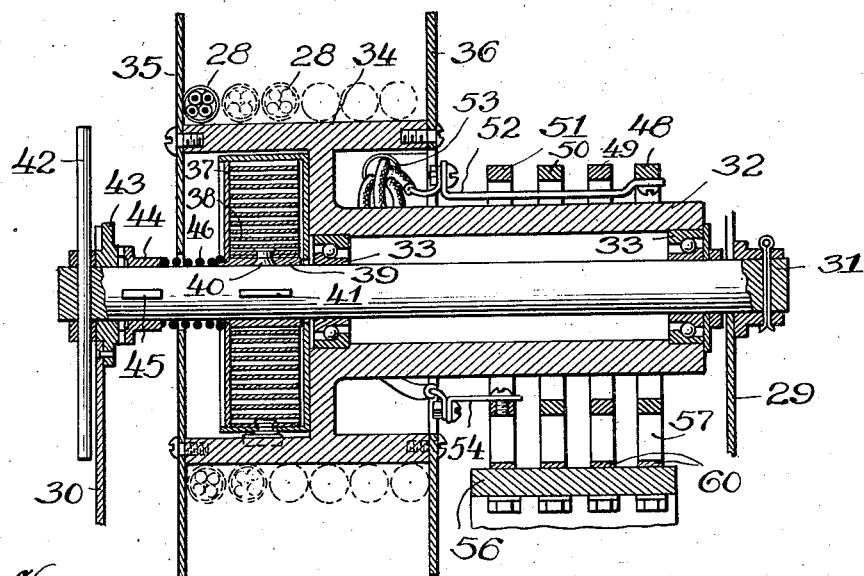
Figure 4 is a longitudinal sectional view through the spool and electrical connections thereror.

Referring now specifically to the drawings, and in which like reference characters refer to like parts throughout, a tractor portion of a truck 20 is shown, having the usual cab 21 mounted thereon, this combination containing the motor, the frame and the driving wheels common in trucks of this type. A truck body 22 is shown having a front wall 23, and resting upon its forward end upon rollers 24 which, in turn, rest upon a supporting bolster 25 forming a portion of the tractor 20. The truck body 22 has the usual rear wheels mounted toward the rear end thereof, the body of the truck being drawn by the tractor portion with the truck body being connected thereto in any suitable manner not concerned with the present invention. We prefer to mount a housing 26 in any suitable manner upon the rear wall of the cab 21, with a distributor box 27 mounted on the front wall 23 of the truck body. A cable 28 extends out of the housing 26 and to the distributor box 27, from which suitable conductor wires lead to various lights on the truck body, such as the stop light, the direction lights, tail lights, and the like. These cables contain a plurality of transmission lines, depending upon the number of electric circuits for lighting purposes which are used in the truck bodies.

Mounted in the housing 26 upon brackets 29 and 30 secured to the bottom of the housing 26 in any approved manner, is a cable reel consisting of a shaft 31 upon which is mounted a reel hub 32 by means of the bearings 33, 33, the hub having an enlarged end 34 with plates 35 and 36 secured thereto which forms the spool for the cable 28. A housing 37 is mounted upon and secured to the shaft 31 in any approved manner, and has a flat clock spring 38 mounted therein, one end of which is secured to a collar 39 by means of a rivet 40, the collar 39 being keyed to the shaft 31 by a key 41. The outer end of the spring is secured to the wall of the housing 37 and to the wall of the enlarged portion 34 of the hub 22, the spring exerting its force normally in a counterclockwise direction, intending at all times to keep the cable 28 wound upon the spool portion of the reel and inside of the housing 26, with the exception of the connecting end of the cable which extends into the distributor box 27 mounted at the front wall 23 of the truck body. The shaft 31 has a hand wheel 42 mounted on the outer end thereof, with a fixed ratchet member 43, secured to the bracket 30, which cooperates with a ratchet member 44 fixed to the shaft by key 45. A spring 46 normally holds the ratchet members in engagement with each other, the purpose of the hand wheel being to rotate the shaft 31 to keep and place the spring 38 under the desired operative tension.

Secured to the hub 32 by means of non-conductor bars 47, 47 is a plurality of conductor rings 48, 49, 50 and 51, these rings being four in number to provide for four electrical circuits with four conductor wires being included in the cable 28. A conductor member 52 is secured at its outer end to the ring 48 and extends longitudinally of the hub. The member 52 has a wire secured thereto at its inner end, the wire being one of the four which is carried by the cable 28, it being understood that the cable 28 extends through a hole 53 formed in the wall of the member 34. The various conductor wires are separated and secured to the conductors, such as 52 and 54. The conductor 54 is secured at its outer end to the ring 51. Similar members are secured to the rings 49 and 50 and are connected to the other wires enclosed within the cable 28.

An insulating block 55 of any suitable material, such as wood, is mounted in the housing 26 upon the bottom thereof. The block 55 has projecting edges 56, 56 thereon to which spring fingers 57, 57 are connected which extend upward therefrom, with support fingers 58, 58 mounted at the rear thereof, the ends of each of the fingers 57, 57 having contact blocks 59, 59 thereon, which engage the surface of the rings 48, 49, 50 and 51, respectively, in a sliding or wiping contact. Connecting strips 60 are employed which connect the fingers together and form conductors from one finger to the opposite finger. A cable 61 leads to a battery or other suitable electric source, with conducting wires 62, 62 thereon which are connected to the fingers 57 by means of screws passing through the edge 56 of the block 55, and through which electric current is conducted into the conductors carried by the cable 28. The spring fingers 58 exert a pressure on the contact block 59 so that a wiping contact is maintained between these members and upon opposite sides of the rings 48, 49, 50 and 51, whereby current can flow through these members and an accurate and certain supply of electricity is provided to the wires in the cable 28.

Figure 8:
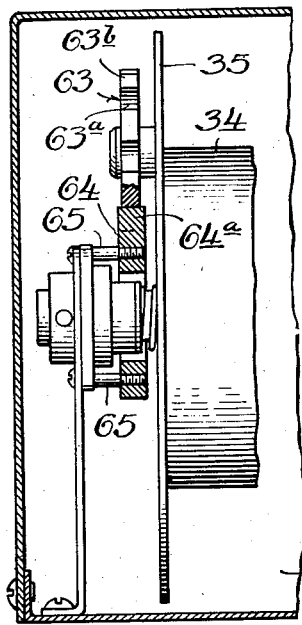
Figure 8 is a vertical sectional view on line 8—8 of Figure 7.
Figure 7:
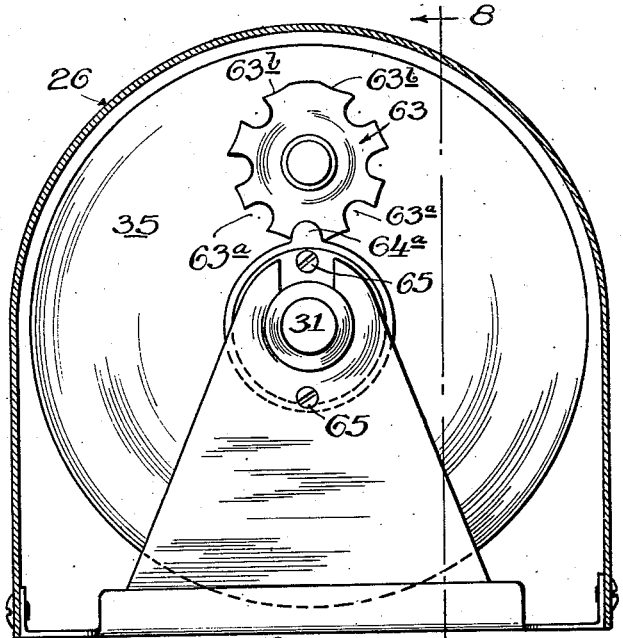
Figure 7 is an end view showing mechanism for preventing an overwind of the reel.

In Figures 7 and 8 means are shown for preventing overwind of the cable either in run out position or in wound position, particularly to prevent breaking of the spring 38 in the runout position of the cable. These means consist of a star wheel 63 having a plurality of recesses 63ª in the outer periphery thereof extending substantially around the entire circumference of the wheel 63 but having spaces 63ᵇ between the recesses which are slightly depressed below the normal outer periphery of the wheel 63. The wheel 63 is fixed against easy rotation on the member 35 of the reel. A holding member 64, having a tooth 64ª, is mounted upon pins 65, 65 in the path of rotation of the wheel 63, the member 64 being movable longitudinally so that it can be moved into and out of engagement with the star wheel 63 when the reel is placed under the desired tension or for other adjusting purposes. If desired, the member 64 may be moved out of the path of the wheel 63 so that it performs no function at all. The member 64 is normally in fixed position and with each revolution of the reel the tooth 64ª is received into one of the recesses 63ª until either a complete run out or complete wind up position of the cable is reached when the tooth 64ª engages upon one of the surfaces 63ᵇ, thereby locking the reel against further rotation.

Figure 10:
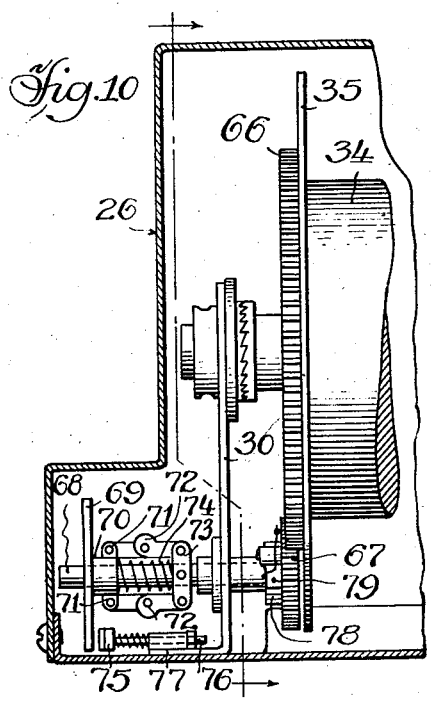
Figure 10 is a fragmentary view taken on line 10—10 of Figure 9 showing the braking mechanism for retarding the speed of the reel.
Figure 9:
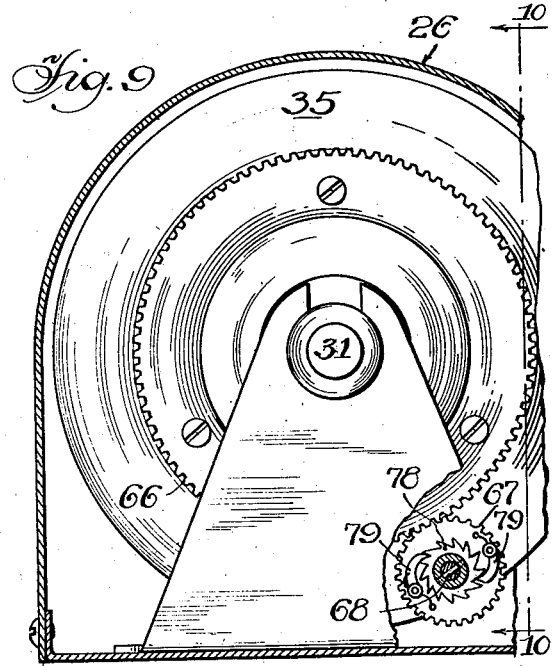
Figure 9 is an end elevational view of a portion of the braking mechanism adapted to be used with our improved apparatus.

In Figures 9 and 10 is illustrated a form of device adapted to be applied in the form of reel illustrated in Figures 1 to 6, inclusive, if desired, and consists of the addition to the member 35 of a ring gear 66. This gear 66 is in engagement with a second small gear 67 mounted upon a shaft 68 journalled in bracket 30, with a rotatably and slidably mounted disc 69 thereon. The rotatable disc 69 has a hub portion 70 from which ears 71, 71 extend, with arms connected to the ears 71 with weighted arms 72, 72 pivotally connected to a collar 73 which is fixed upon the shaft 68. A spring 74 is interposed between the collar 73 and the hub 70 which normally holds the disc 69 in the position shown in the drawing towards the end of the shaft 68. A braking member 75 mounted upon a shaft 76 through a sleeve 77, is secured to the bottom of the housing 26 for cooperation with the disc 69. Alongside gear 67 and fixed to the shaft 68 is a ratchet wheel 78 which is engaged by detents 79, 79 in the gear 67, these detents 79, 79 normally riding over the ratchet teeth during the unwinding of the reel, but engaging the teeth during the rewinding operation, thus rotating the shaft 68 and the disc 69. Upon the too rapid rotation of the reel the disc is drawn against the braking member 75 through centrifugal force imparted to the weighted arms 72, thereby checking the speed of rotation of the disc and the reel and preventing any damage to the winding mechanism or the breaking loose of the various parts making up the reel.

In Figures 11 to 13, inclusive, we have illustrated a modified form of housing for the reel, Figures 11 and 12 illustrating a housing capable of allowing the cable to move in a plurality of directions, while Figure 13 provides for universal movement and in Figure 14 the housing is mounted within the cab. Referring particularly to Figures 11 and 12, a U-bracket 80 is provided to which a housing 81 is pivotally secured by means of studs at the bottom and top thereof, and upon which an extension 82 is provided through which the cable 28 extends. Electric connections 83, 83 contact upon a plate 84 through which suitable connections may be made, similar to those hereinabove described leading to the reel such as described in Figures 2 to 6 inclusive. An arm 85 is provided within which a pin 86 is positioned for endwise engagement with a spring 87 held under tension by means of a bolt 88, so that lateral movement of the housing 81 is provided, but a braking action is maintained between these elements to prevent loose swinging of the housing 81 on its pivot. The housing 81, however, is capable of turning laterally so as to set in proper alignment with the distributor box on the front of the truck body.

In Figure 13 is illustrated another form of housing for universal movement, and in which a stud 89 is mounted in the rear wall of the cab 21 and projects rearwardly therefrom. A bracket 90 is mounted upon the stud 89 for either fixed or radial movement having the housing 91 secured thereto by means of a trunnion 92 and a bolt 93 having a threaded member 94 on the outer end thereof. The bolt 93 extends through the slot 95 in the bracket 90 so that radial movement about the center 92 is provided for the housing 91. Springs 96, 96 are mounted upon a bolt 97 and normally tend to keep the housing 91 in its proper position, with an extension 98 directed toward the distributor box 27 at the front end of the truck. If desired, as illustrated in Figure 14, a housing 99 may be mounted inside of the cab 21 with the cable 28 projecting rearwardly therefrom through an opening in the rear of the cab, so that the housing is protected from action of the weather.

The operation of the reel will be readily understood from the foregoing description, in that the source of electrical energy is conducted to the reel through the conductors contained in the cable 61 to the members 57 through the fingers 58, contact member 60 and rings 48, 49, 50 and 51, respectively, to the various conductor wires carried by the cable 28. The cable 28 projects rearwardly from its housing mounted at the rear side of the cab, where the end, with a suitable and easy electric fastening means, is secured inside of the distributor box mounted upon the forward end of the truck body. The cable, of course, must be of sufficient length so that a maximum of cable is provided to span the distance between the cab of the truck and the trailer body at all times, regardless of the relative position of these two parts of the truck. Upon the tractor portion of the truck being turned at an angle, the distance will, of course, be shortened and the cable will automatically be shortened upon the reel taking out all slack and keeping the cable substantially taut. This avoids the possibility of the cable dropping down and becoming enmeshed with some of the operating parts of the truck so that when the tractor is turned into another position the cable is broken and the lights on the truck body go out, ofttimes without the driver of the truck being aware of this fact, thus increasing the hazard of driving both to the truck and to other drivers as well. When the tractor part of the truck is again straightened out with respect to the body of the truck, the cable will, of course, unwind sufficiently so that the proper electrical connection is maintained between these parts at all times.

If desired, mechanism shown in Figures 7 and 8 may be employed to prevent overwinding of the cable in either its reeling out or reeling in position, and also the wheel 63 may be so positioned that the movement of the reel in one direction may be limited by sliding the member 64 out and adjusting the wheel 63 with relation to the number of turns the reel may take before it is prevented from further rotation by engagement of the tooth 64$^a$ on one of the surfaces 63$^b$. Also, the mechanism shown in Figures 9 and 10 may be employed to slow the rotation of the reel should the cable break or become unintentionally disconnected from the distributor box 27.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of the appended claims.

What is claimed is:

1. In combination with a trailer truck, a housing on the tractor portion of the truck, a rewind reel in said housing having a hub portion rotatably mounted on a shaft and a spool portion, a cable on said spool portion having a plurality of conductors therein, spring rewind means connected to said shaft and reel, a plurality of laterally spaced conductor rings on said hub portion of the reel, a conductor block, spring contact fingers on said block in frictional contact with the said rings, an electrical supply cable connected to said contact fingers on said conductor block, separate connectors electrically connecting each of said cable conductors to one of the said rings, means to adjust the tension of said spring rewind means, and braking means whereby the speed of rewind rotation of the reel is controlled upon the release of the cable.

2. In combination with a trailer truck, a housing on the tractor portion of the truck, a rewind reel in said housing having a hub portion and a spool portion rotatably mounted on a shaft, a cable on said spool portion having a plurality of conductors therein, spring rewind means connected to said shaft and reel, a plurality of laterally spaced conductor rings on said hub portion of the reel, a conductor block, spring contact fingers on said block in frictional contact with the said rings, an electrical supply cable connected to said contact fingers on said conductor block, separate connectors electrically connecting each of said cable conductors to one of the said rings, means to adjust the tension of said spring rewind means, and speed control means governing the speed of the reel as it rewinds.

3. In combination with a trailer truck, a housing on the tractor portion of the truck, a rewind reel in said housing having a hub portion and a spool portion rotatably mounted on a shaft, a cable on said spool portion having a plurality of conductors therein, spring rewind means connected to said shaft and reel, a plurality of laterally spaced conductor rings on said hub portion of the reel, a conductor block, spring contact fingers on said block in frictional contact with the said rings, an electrical supply cable connected to said contact fingers on said conductor block, separate connectors electrically connecting each of said cable conductors to one of said rings, means to adjust the tension of said spring rewind means, a gear wheel on said reel, a rotatably mounted shaft, a disc on said shaft, a gear on said shaft in mesh with said first gear wheel, and a governor on said shaft operable in one direction only.

NICHOLAS F. DOUR.
VICTOR R. STENGER.